Sept. 5, 1961     F. J. CLOUTIER ET AL     2,998,736
TOOL MOUNTING FOR BORING BAR Filed Nov. 4, 1960     2 Sheets-Sheet 2

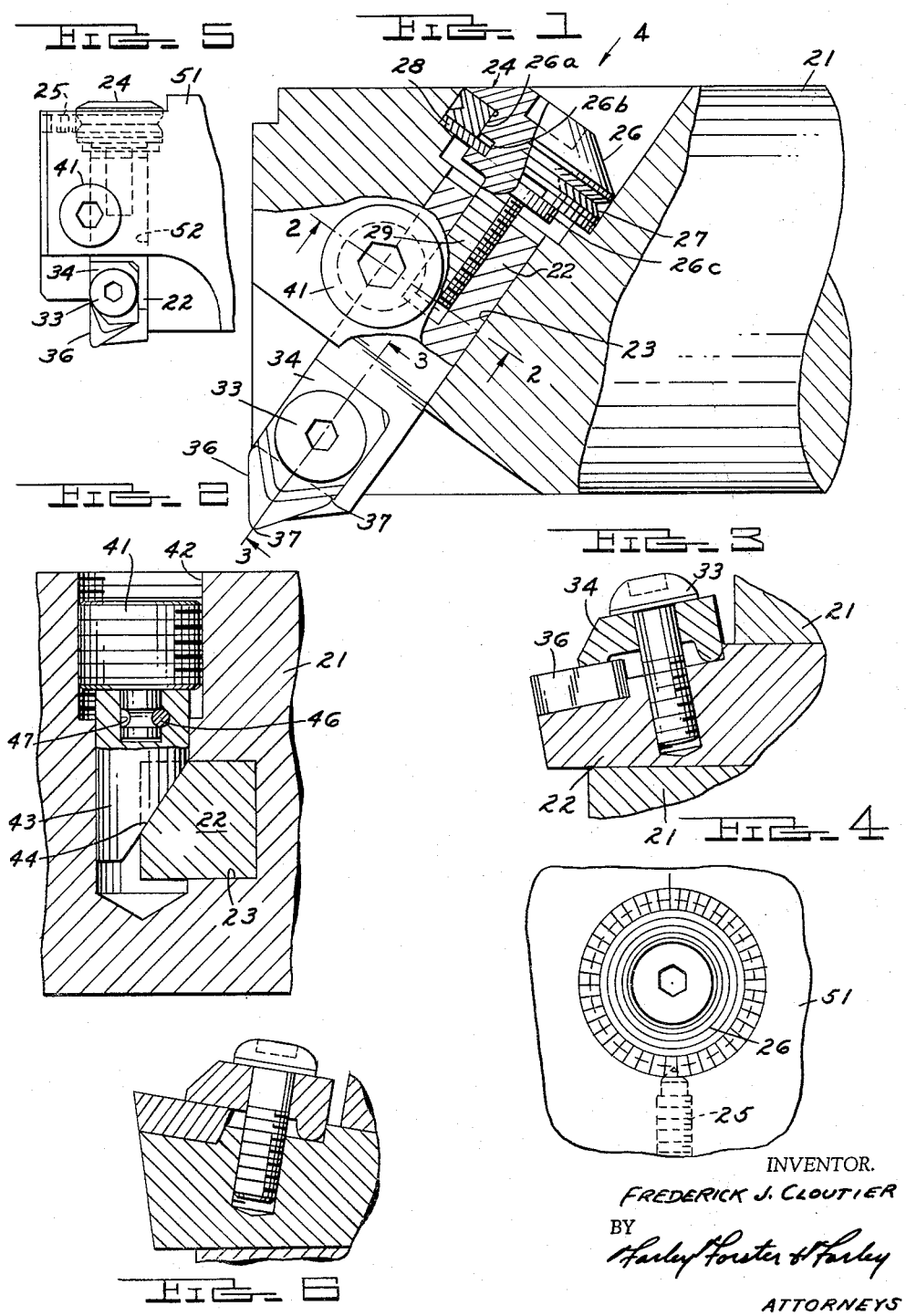

INVENTORS
FREDERICK J. CLOUTIER
BY VICTOR MILEWSKI

ATTORNEYS

2,998,736
TOOL MOUNTING FOR BORING BAR
Frederick J. Cloutier, Detroit, and Victor Milewski, Royal Oak, Mich., assignors to The Valeron Corporation, Detroit, Mich., a corporation of Michigan.
Filed Nov. 4, 1960, Ser. No. 67,439
5 Claims. (Cl. 77—58)

This invention pertains to an improved adjustable tool mounting construction for a boring bar. The present application is a continuation-in-part of copending application Serial No. 711,746, filed January 28, 1958, and expressly abandoned by the filing of this application. The boring bar disclosed herein has a broached socket preferably square with at least two adjacent flat sides into which fits a tool holder having two complementary flat sides. By using a wedge against the holder, to force the flat sides of the holder against those of the socket, a large area of contact between the holder sides and the socket sides is provided insuring an exceptionally rigid construction. This invention teaches the use of at least two walls of a holder urgeable against two corresponding walls of a socket to provide a rigid construction for a precisely mounted holder which undergoes substantially large forces in cutting metal and the like.

Also provided is an indexible tool bit which has means for securing it to the tool holder separate from the wedge or other locking means used to lock the holder in the boring bar. This has the advantage that when either the holder or the tool bit is loosened for adjustment, the other will be held securely and need not and will not lose its initial adjustment. Also provided is a micrometer means for adjusting the holder in the square socket of the boring bar in precise increments.

It is, therefore, an object of this invention to provide a boring bar having a rigidly mounted tool bit holder.

Another object is to provide means for wedging at least two walls of the tool bit holder against two corresponding walls of the boring bar for rigid multi-directional support.

Another object is to provide a removable indexible tool bit which is clamped in the tool bit holder by means which are separate from clamping the holder in the boring bar.

Another object is to provide the above construction with a micrometer adjusting means.

These and other objects will become more apparent when a preferred embodiment is described in detail in connection with the following drawings:

FIGURE 1 shows a cut-away view of boring bar having an angular holder and insert cutter mounted therein;

FIGURE 2 is a section taken at 2—2 of FIGURE 1 showing the square cross section of holder and boring bar socket and the wedge means for locking the holder in the shaft;

FIGURE 3 is a section taken at 3—3 of FIGURE 1 showing the means for clamping the insert cutter with a negative rake angle in the holder;

FIGURE 4 is a view taken from the direction of arrow 4 in FIGURE 1;

FIGURE 5 is a plan view of a second embodiment having a right angle tool holder;

FIGURE 6 is a sectional view similar to FIGURE 3 showing a preferred means for clamping an insert cutter with a positive rake angle in the holder; and FIGURES 7, 8 and 9 are views similar respectively to FIGURES 1, 4 and 5 showing a modified fitted construction of the retainer ring and a threaded socket in the boring bar for receiving same.

Figure 7:
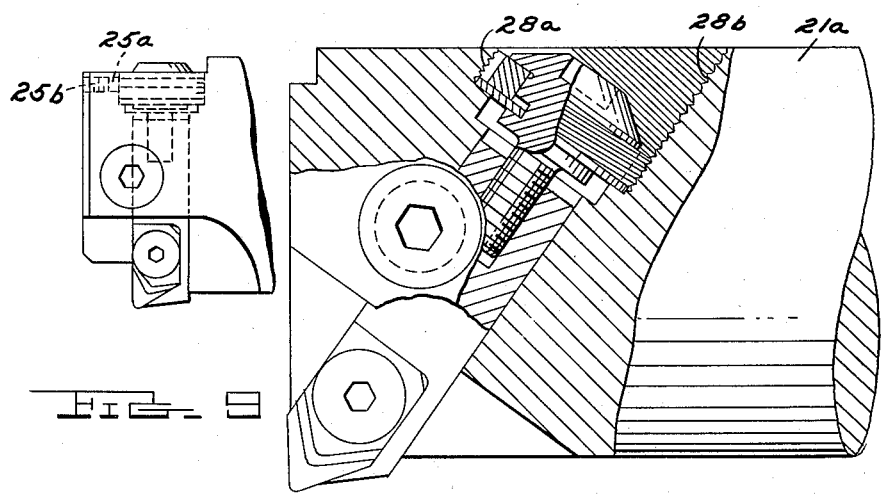
Figure 8:
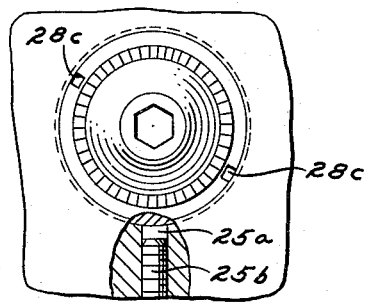

In FIGURE 1 is shown boring bar 21 with holder 22 slidably fitted in square broached socket 23. Micrometer screw 24 has a calibrated head 26, a reduced annular land 26a accommodating retainer ring 27, and a circumferential groove 26b for receiving snap retainer ring 28. The ring 27 is lightly press fit in the body 21 and provided with a V groove engaged by a set screw 25 adapted to hold ring 27 and snap retainer ring 28 firmly against the adjacent shoulder in the body 21. The rings 27 and 28 fit snugly between head 26 and land 26c so as to avoid any lost motion therebetween upon a reversing adjustment of the micrometer head. Shank 29 is threadedly engaged with holder 22 to cause longitudinal or axial movement of the holder in socket 23 when screw 24 is turned. Threadedly engaged with the end of holder 22 is locking screw 33 (FIGURES 1 and 3) which seats on clamp 34 which holds insert cutter 36 in place in holder 22. Triangular insert cutter 36 is adjustable in holder 22 to position one of three cutting points 37 in cutting position, and may be turned over to provide three additional cutting points, with a negative rake angle provided by the cutter seat. A preferred positive rake angle seat is shown in FIGURE 6 with the triangular insert cutter beveled on its three sides to provide desired chip clearance. This form of cutter is of course limited to three cutting point positions but provides better cutting action on many types of metals.

In FIGURE 2 is seen the means for wedging or locking two sides of holder 22 against the corresponding sides of socket 23. Set screw 41 is threadedly engaged in bore 42 and moves wedge 43 longitudinally to force holder 22 against the walls of socket 23. The square cross section of holder 22 and socket 23 may be easily seen with holder 22 having an angled slot 44 to receive the cam surface of wedge 43. With this wedging action, large surface high pressure contact against normal planes of holder 22 and socket 23 is effected. A steel pin 46 engages groove 47 for retraction of the wedging element 43 upon reverse rotation of screw 41.

A right angle mounting of holder 22 in bar 51 is shown in FIGURE 5. This embodiment also has a broached socket 52 with two adjacent planes against which holder 22 is clamped by a wedge and screw combination similar to that shown in FIGURE 2.

Referring to FIGURE 7, a threaded retainer ring 28a and threaded socket 28b therefor in the boring bar 21a are employed as an alternative to the press fit retainer ring 28 as a means for more positively locating and axially holding the calibrated adjustment head. A pair of slots 28c are provided in the retainer ring for seating the assembly with a spanner wrench and a brass shoe 25a is pressed against the threads by set screw 25b in place of the set screw 25 engaging a V groove in the retainer ring 28 of the first embodiment.

While two preferred embodiments of our invention have been illustrated and described above in detail, it will be understood that numerous modifications may be resorted to without departing from the scope of the invention as defined in the following claims.

We claim:

1. A tool comprising a rotatable main body, a tool holder passage extending through said body having a pair of angularly spaced tool holder seating surfaces, a tool holder having a pair of complementary angularly spaced surfaces engageable with said seating surfaces throughout a range of adjustment for said tool holder in said passage, an indexible cutter element at one end of said tool holder, means for clamping said cutter element in any of a plurality of positions, a threaded hole in the other end of said tool holder extending in the direction of said adjustment, a rotatable calibrated adjustment screw engaging said threaded hole, means seated in said body fixing the axial position of said adjustment screw, and separate means for rigidly clamping said tool holder with both of said complementary tool holder surfaces in positive pressurized engagement against both of said seating surfaces, said means fixing the axial position of said adjustment screw includes a shoulder surface in said body, spaced shoulder surfaces in said adjustment screw, an annular retainer ring and a snap ring fitting closely within said shoulder surfaces in said adjustment screw and in fixed abutment with said body shoulder surfaces, said annular retaining ring being press fit in said body against said shoulder surface therein.

2. A tool comprising a rotatable main body, a tool holder passage extending through said body having a pair of angularly spaced tool holder seating surfaces, a tool holder having a pair of complementary angularly spaced surfaces engageable with said seating surfaces throughout a range of adjustment for said tool holder in said passage, an indexible cutter element at one end of said tool holder, means for clamping said cutter element in any of a plurality of positions, a threaded hole in the other end of said tool holder extending in the direction of said adjustment, a rotatable calibrated adjustment screw engaging said threaded hole, means seated in said body fixing the axial position of said adjustment screw, and separate means for rigidly clamping said tool holder with both of said complementary tool holder surfaces in positive pressurized engagement against both of said seating surfaces, said means fixing the axial position of said adjustment screw includes a shoulder surface in said body, spaced shoulder surfaces in said adjustment screw, an annular retainer ring and a snap ring fitting closely within said shoulder surfaces in said adjustment screw and in fixed abutment with said body shoulder surface, a V groove in the perimeter of said retainer ring, and a set screw in said body adapted to engage said V groove.

3. A tool comprising a rotatable main body, a tool holder passage extending through said body having a pair of angularly spaced tool holder seating surfaces, a tool holder having a pair of complementary angularly spaced surfaces engageable with said seating surfaces throughout a range of adjustment for said tool holder in said passage, an indexible cutter element at one end of said tool holder, means for clamping said cutter element in any of a plurality of positions, a threaded hole in the other end of said tool holder extending in the direction of said adjustment, a rotatable calibrated adjustment screw engaging said threaded hole, means seated in said body fixing the axial position of said adjustment screw, and separate means for rigidly clamping said tool holder with both of said complementary tool holder surfaces in positive pressurized engagement against both of said seating surfaces, said means fixing the axial position of said adjustment screw includes a shoulder surface in said body, spaced shoulder surfaces in said adjustment screw, an annular retainer ring and a snap ring fitting closely within said shoulder surfaces in said adjustment screw and in fixed abutment with said body shoulder surfaces, said annular retaining ring and body being threaded for ring engagement in said body against said shoulder surface therein.

4. A tool comprising a rotatable main body, a tool holder passage extending through said body having a pair of angularly spaced tool holder seating surfaces, a tool holder having a pair of complementary angularly spaced surfaces engageable with said seating surfaces throughout a range of adjustment for said tool holder in said passage, an indexible cutter element at one end of said tool holder, means for clamping said cutter element in any of a plurality of positions, a threaded hole in the other end of said tool holder extending in the direction of said adjustment, a rotatable calibrated adjustment screw engaging said threaded hole, means seated in said body fixing the axial position of said adjustment screw, and separate means for rigidly clamping said tool holder with both of said complementary tool holder surfaces in positive pressurized engagement against both of said seating surfaces, said means fixing the axial position of said adjustment screw includes a shoulder surface in said body, spaced shoulder surfaces in said adjustment screw, an annular retainer ring and a snap ring fitting closely within said shoulder surfaces in said adjustment screw and in fixed abutment with said body shoulder surface, a threaded perimeter on said retainer ring engaging a threaded socket in said tool holder, and a shoe and set screw in said body adapted to engage the threaded perimeter of said retainer ring.

5. A tool comprising a rotatable main body, a tool holder passage extending through said body having a pair of angularly spaced tool holder seating surfaces, a tool holder having a pair of complementary angularly spaced surfaces engageable with said seating surfaces throughout a range of adjustment for said tool holder in said passage, an indexible cutter element at one end of said tool holder, means for clamping said cutter element in any of a plurality of positions, a threaded hole in the other end of said tool holder extending in the direction of said adjustment, a rotatable calibrated adjustment screw engaging said threaded hole, means seated in said body fixing the axial position of said adjustment screw, and separate means for rigidly clamping said tool holder with both of said complementary tool holder surfaces in positive pressurized engagement against both of said seating surfaces, said means fixing the axial position of said adjustment screw includes a shoulder surface in said body, spaced shoulder surfaces in said adjustment screw, an annular retainer ring and a snap ring fitting closely within said shoulder surfaces in said adjustment screw and in fixed abutment with said body shoulder surfaces, said annular retaining ring being secured in said body against said shoulder surface therein.

References Cited in the file of this patent

UNITED STATES PATENTS

| | | |
|---|---|---|
| 1,814,921 | Hartwell | July 14, 1931 |
| 2,537,274 | Le May | Jan. 9, 1951 |
| 2,669,890 | Tao | Feb. 23, 1954 |
| 2,704,881 | Barrett | Mar. 29, 1955 |
| 2,791,824 | Greenleaf | May 14, 1957 |